(12) United States Patent
Sengupta et al.

(10) Patent No.: US 8,069,371 B2
(45) Date of Patent: Nov. 29, 2011

(54) METHOD AND SYSTEM FOR REMOTELY DEBUGGING A HUNG OR CRASHED COMPUTING SYSTEM

(75) Inventors: Sabyasachi Sengupta, Bangalore Karnataka (IN); Vinay Krishnamurthy, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 847 days.

(21) Appl. No.: 12/110,180

(22) Filed: Apr. 25, 2008

(65) Prior Publication Data

US 2008/0295077 A1 Nov. 27, 2008

(30) Foreign Application Priority Data

Apr. 26, 2007 (IN) .............................. 892/CHE/2007

(51) Int. Cl.
*G06F 11/00* (2006.01)

(52) U.S. Cl. ....................................... 714/37; 714/38.14

(58) Field of Classification Search ................... 714/37, 714/38, 39, 38.1, 38.12, 38.13, 38.14; 717/124, 717/126, 128
See application file for complete search history.

(56) References Cited

U.S. PATENT DOCUMENTS

| 5,630,049 | A | * | 5/1997 | Cardoza et al. ................. 714/25 |
| 6,167,358 | A | * | 12/2000 | Othmer et al. ................. 702/188 |
| 7,546,607 | B2 | * | 6/2009 | Demsey et al. ................. 719/318 |
| 2005/0114738 | A1 | * | 5/2005 | Ma et al. ......................... 714/38 |
| 2010/0088683 | A1 | * | 4/2010 | Golender et al. ............. 717/128 |

* cited by examiner

*Primary Examiner* — Dieu-Minh Le

(57) ABSTRACT

A method and system for debugging a computer upon a kernel hang and/or upon a software failure, the method comprising executing a debugger on a remote computer, connecting the hung or crashed computer to the remote computer with a communications link, and debugging the hung or crashed computer with the debugger without rebooting the system. The method may include deconfiguring any kernel driver of the computer attached to the communication card prior to connecting the remote debugger to the computer.

19 Claims, 2 Drawing Sheets

METHOD AND SYSTEM FOR REMOTELY DEBUGGING A HUNG OR CRASHED COMPUTING SYSTEM

RELATED APPLICATIONS

This patent application claims priority to Indian patent application serial no. 892/CHE/2007, having title "Method and System for Remotely Debugging a Hung or Crashed Computing System", filed on 26 Apr. 2007 in India, commonly assigned herewith, and hereby incorporated by reference.

BACKGROUND OF THE INVENTION

Existing servers running UNIX brand or comparable operating systems (such as HP-UX) generally must remain running for extended periods, in some cases for months. However, such a server may—after prolonged use—behave slowly or become unresponsive. For example, owing to prolonged and heavy use, the server may have become so loaded that it does not allow the spawning of even a single process. For example, even simple programs such as "ps" and "ls" may fail and give rise to the error message "fork: no more processes".

In such situations, system administrators at user sites employ performance monitoring tools and "Live" Kernel debugging tools. However, these tools essentially run as user processes and, in heavily loaded systems, even these processes require system resources so may not work. Also, kernel debuggers require the kernel to be booted with special flags, a further inconvenience.

Some operating systems include a system debugger that operates in the kernel space of their respective kernels and which can be entered upon entering a special key sequence from the system console. However, single system debuggers are often assembly level debuggers, so are limited to program debugging at the machine instruction level; they do not allow at program debugging at the source level. In addition, they cannot kill offending processes or free up any resources from the system. Significantly, they require the kernel always to be booted with special debug options, such that these debuggers remain effective throughout the lifetime of the system; as a result their use can significantly reduce the performance of the system at the lowest level, especially on interrupt and trap processing by the kernel, such effects arising from the memory requirements of running the debugger.

Alternatively, when a system hangs, the system administrator may induce a crash dump so that he or she can perform a post-crash (or 'post-mortem') analysis of the problem; this is time consuming for the system administrator and incurs considerable downtime for users, particularly those of large enterprise servers. Such downtime is unwelcome for critical applications, reducing as it does the availability of, for example, enterprise servers.

Similarly, following a 'kernel panic' (a software failure inside the kernel) in most implementations of UNIX, actual post-mortem analysis can begin only after a crashdump (which provides a snapshot of the physical memory state) has been written to the disk and subsequently saved to the file system. As mentioned above, this leads to considerable system downtime, which may not be acceptable to enterprise UNIX customers.

FIG. 1 is a schematic time-line 100 of the downtime in a crash dump based method of the background art. The system is booted up at time T=0. At T=$t_1$ the system enters the hung state and the system administrator issues a forced crash. From T=$t_1$ to T=$t_2$ a file system buffer save is performed and the crash dump collection writes the dump to the dump device (i.e. the dump disk). At T=$t_2$ the system is down and, from T=$t_2$ to T=$t_3$ firmware tests are performed by the system administrator. A system boot is performed at T=$t_3$ and, from T=$t_3$ to T=$t_4$, the startup script (known in HP-UX as savecrash (1)) saves the dump to the file system. From T=$t_4$ the system is again running normally.

The total downtime of the system is therefore $\Delta T=(t_4-t_1)$, the greater part of which is due to the time required for the crash dump collection to write the dump to the dump disk; the next greatest contribution to the downtime is due to the time required to copy the crash dump from the dump device to the file system. In most UNIX implementations, the crash dump readers cannot process the crash dump until the crash dump has actually been written onto the file system, because the dump in the dump disk device is not in a format that can be understood by the file system. This is essentially a two step process, as servers cannot write crash dump onto the file system directly while going down after the crash; this is because the state of the file system itself may be inconsistent, and using the file system at that time may involve significant risk.

The main limitation of this approach is that the actual analysis of the problem can start only once the dump has been saved to disk (such as with the aforementioned savecrash(1) utility) during the boot process that follows the crash. Also, users cannot again use the system until after the system has completed saving the dump to the file system. The writing of the dump to the dump device itself depends on the size of the physical memory of the system and, as mentioned, this contributes the greatest amount of downtime. This approach is essentially the same method followed for all kinds of crash dumps, whether after a software panic, a hardware failure or the detection of a hung system.

BRIEF DESCRIPTION OF THE DRAWING

In order that the invention may be more clearly ascertained, embodiments will now be described, by way of example, with reference to the accompanying drawing, in which.

DETAILED DESCRIPTION OF THE EMBODIMENTS

There will be provided a method and system for debugging a hung, crashed or panicked computing system (including any electronic device, such as a computing device, with an operating system), that is, whose operating system has hung or crashed or where a software panic has occurred.

In one embodiment, the method comprises executing a debugger on a remote computer, connecting the computing system to the remote computer with a communications link (such as a LAN card implementing the ethernet protocol), and debugging the operating system or panicked software of the computing system with the debugger (that is, over the communications link). The method may include, before connecting the remote computer to the computing system, deconfiguring a kernel driver in the computing system that previously had claimed a communications link interface card (e.g. a LAN card) for supporting the communications link.

In another embodiment, a method for debugging a hung or crashed operating system or panicked software of a computing device comprises executing a debugger on a remote computer, connecting the computing device to the remote computer with a communications link, and debugging the operating system or the panicked software with the debugger.

There will also be provided a computing system. In one embodiment, the system comprises an operating system, a remote computing device, a communications link for connecting the computing system and the remote computing device, and a debugger accessible by the remote computing device and executable on the remote computing device. The remote computing device is operable to connect to the computing system with the communications link and to execute the debugger, the debugger being operable by a user to debug the operating system or panicked software following the operating system hanging or crashing, or the software panicking.

Figure 1:
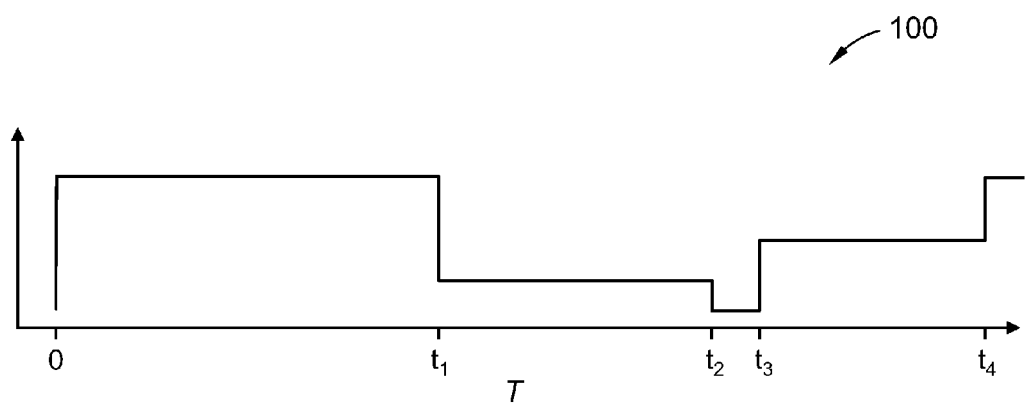
FIG. 1 is a schematic time-line of the downtime in a background art crash dump based method.
Figure 2:
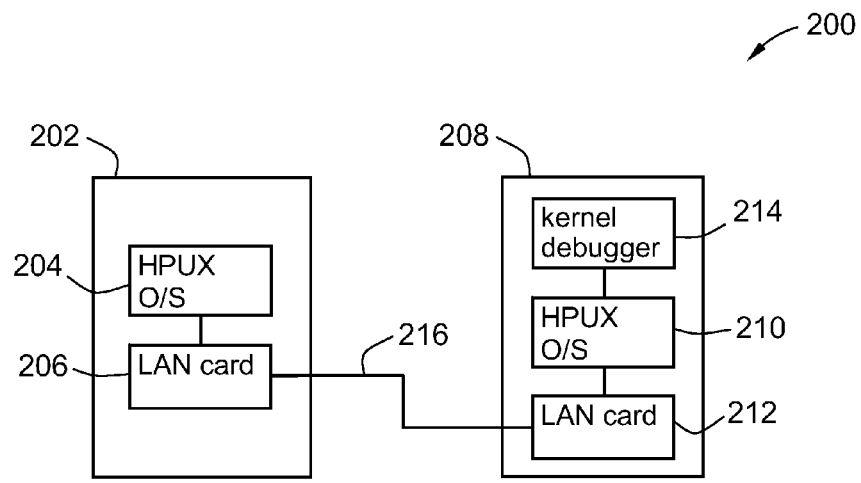
FIG. 2 is a schematic view of a computing system according to an embodiment of the present invention.

FIG. 2 is a schematic view of a computing system 200 according to an embodiment of the present invention. Only features relevant to gaining an understanding of this embodiment are shown. Thus, system 200 includes a host server in the form of a HP-UX enterprise server 202 that has an operating system in the form of a HP-UX operating system 204 and LAN card 206. System 200 also includes a remote host computer 208 in the form of a second HP-UX enterprise server, with its own operating system in the form of a HP-UX operating system 210, and its own LAN card 212. It is envisaged, however, that embodiments of the present invention would also be provided for other operating systems of the UNIX family (e.g. Solaris, AIX, etc), as well as other non-UNIX operating systems.

In addition, remote host 208 includes a kernel debugger 214 (which, being remote to server 202, is termed 'remote debugger 214' henceforth); remote debugger 214 is a tool for debugging problems if operating system 204 of main server 202 hangs or crashes, or a software panic occurs on server 202. Host server 202 and remote host 208 are in data communication, in this embodiment via LAN 216; the characteristics of this remote communication and a number of ways in which it can be implemented according to this embodiment are discussed below.

It should be noted that the term "debugging" and variants thereof are used in the broad sense of analyzing problems. They are not used in the narrow sense of eliminating or removing bugs, though this narrow sense is embraced by the broad meaning.

Overview

Figure 3:
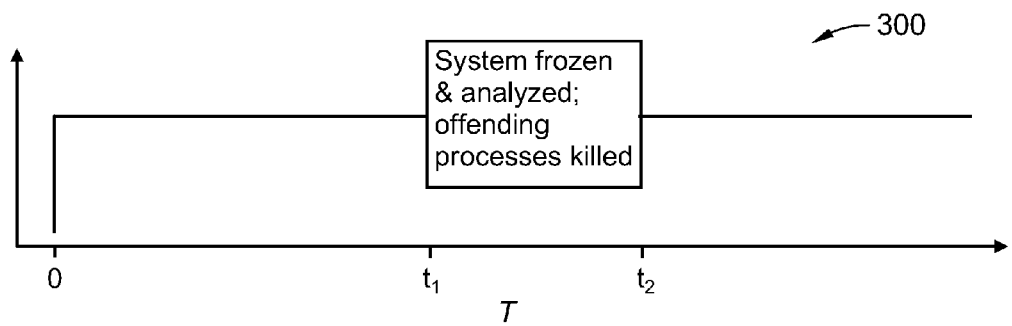
FIG. 3 is a schematic time-line of the downtime in the method implemented according to an embodiment of the present invention in the computing system of FIG. 2.

FIG. 3 is a schematic time-line of the operation of this embodiment when server 202 hangs. Server 202 is booted up at time T=0. At T=$t_1$ the server 202 hangs and the user (typically a system administrator) at remote host 208 freezes and analyses the server 202, identifies the problem with remote debugger 214 and kills the offending process or processes. At T=$t_2$ the server 202 is restored to normal operation, with no actual downtime (though as will be appreciated the server 202 cannot be used between T=$t_1$ and $t_2$).

At the outset, at time $t_1$ (when a hung situation is detected by, for example, a system administrator), the administrator presses a designated key sequence at the system console. The key sequence is translated into an interrupt handler, which initializes a debugger subsystem (not shown) of the hung operating system 204 so that the remote debugger 214 can connect to server 202. The debugger initialization steps are performed only upon system hang. (That is, since remote debugger 214 is not active before server 202 hangs, these initializations are performed asynchronously when the hang occurs.)

In addition, so that the communication of remote debugger 214 with server 202 does not change the data structures of the main server's kernel driver, as part of the debugger initialization the kernel driver of server 202 is temporarily deconfigured, a kernel debugger driver for a communications device (i.e. the LAN or any other networking device, such as a serial port of server 202 or the dedicated debug port available on some of HP computers) is attached to the LAN card 206, remote debugger 214 is initialized and the administrator (for example) can then analyze the problem using remote debugger 214 over LAN 216. Once the analysis is complete, the old driver is restored on LAN card 206, after destroying the debugger version of the network driver.

In an alternative method, enterprise servers may have hardware buttons against each PCI card (as is common in HP servers) that, when pressed, prompt the hardware to raise an interrupt to the kernel. (The interrupt processing does not take up any process table slots, so can be processed even on a highly loaded system.) Once this interrupt arrives, the kernel deconfigures the PCI card then, if kernel debugger 214 is flagged for hangtime initialization, kernel debugger 214 is initialized.

Finally, remote debugger 214 is deinitialized once the cause of the hang is determined and the rouge or offending processes are terminated. This is so that remote debugger 214 does not affect the future performance of the server 202.

A number of other communication methods can be used for communication between remote debugger 214 and server 202, depending on the type of system being used. For example, HP 9000 servers, which run HP-UX, have a dedicated hardware debug port that is used for remote communication. On these platforms, remote debugger 214 can communicate without the additional pre-connectivity steps described above; the first packet sent by remote debugger 214 initializes the kernel infrastructure of hung server 202.

Once connected to server 202 remotely, remote debugger 214—operating in the user space on remote host 208—has an array of commands and user level scripts, mostly written in perl but also in other programming languages, that allow the user to ascertain the cause of the hang. Hogged memory can be freed, rouge processes can be terminated and deadlocked resources can be returned to the kernel; this is because, when the remote kernel debugger has connected to the hung kernel, no other processor (other than a single foreground processor) is active and everything else is stopped. The kernel infrastructure of remote debugger 214 operates essentially in the target (hung) kernel (i.e. of server 202), so it has access to all the kernel memory. As remote debugger 214 operates in the interrupt context, there is little if any effect on that kernel's data structures (such as process tables and scheduler). Also, remote debugger 214 quiesces (freezes) server 202 while being debugged, so an accurate snapshot of server 202 is possible.

Once all these steps have been completed, remote debugger 214 detaches from the target kernel. In order to deinitialize remote debugger 214, a simple command is executed by a privileged superuser (now that the system is back to normal) that deactivates remote debugger 214 and returns the resources that were being used (such as a LAN card of server 202 that was used for communication with remote debugger 214).

Figure 4:
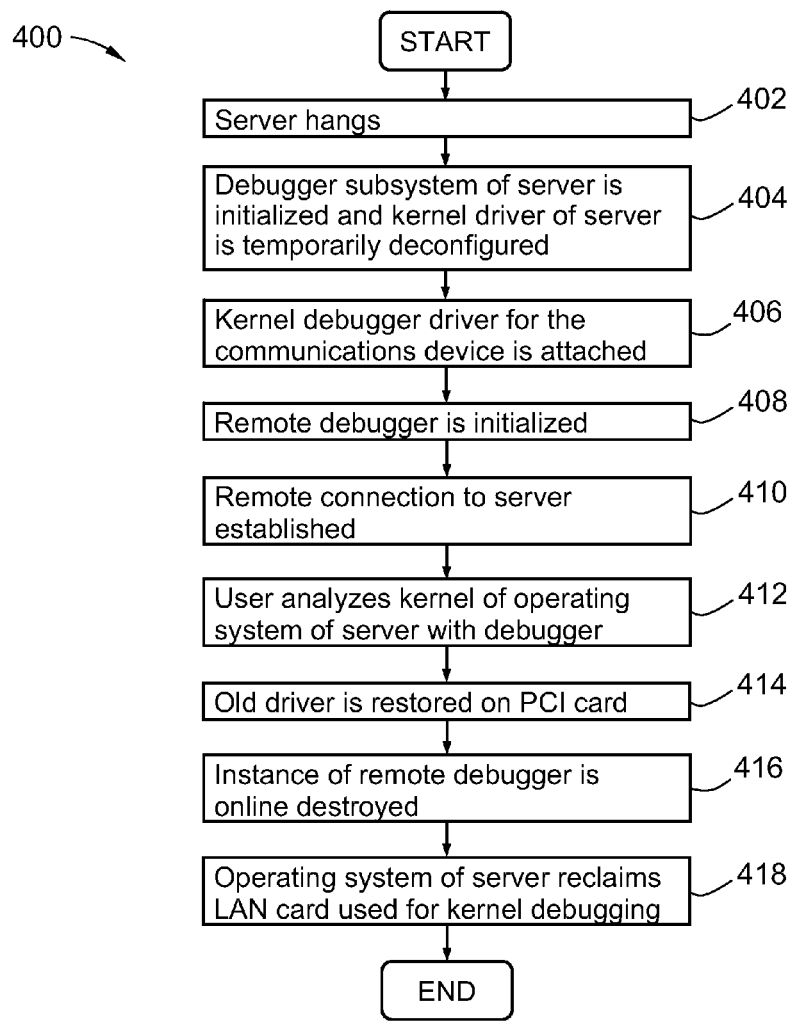
FIG. 4 is a flow diagram of the method implemented according to an embodiment of the present invention in the system of FIG. 2.

FIG. 4 is a flow diagram 400 of the method for remotely debugging a hung system thus employed by system 100. At step 402, server 202 hangs. At step 404, the debugger subsystem of hung operating system 204 is initialized and the kernel driver of server 202 is temporarily deconfigured. At step 406, the kernel debugger driver for the communication device is attached and, at step 408, remote debugger 202 is initialized on remote host 208.

At step 410, a remote connection to server 202 is established. At step 412, the user analyses the kernel of operating system 204 of server 202 with remote debugger 214 from remote host 208.

At step 414, the old driver is restored on the relevant PCI card and, at step 416, the instance of remote debugger 214 used for the debugging is online destroyed. Finally, at step 418, operating system 204 of server 202 reclaims LAN card 206 used for the kernel debugging.

For software failures (panics), debugger initialization is slightly different, though the connectivity and remote analysis aspects of the procedure are essentially the same. Upon such kernel panic, an architected call in the "panic" processing path can initialize the debugger before the dump is actually written to the dump device. Now that the system has panic'd, the kernel debugger device driver can directly "claim" (that is, take over) the communication interface card, and provide a mechanism for the remote debugger 214 to attach to the panic'd system 202. In effect the remote debugger 214 views the kernel memory of host server 202 as a remote crashdump. All supporting scripts that are otherwise executed on a crashdump can be directly run on the failed memory of the crashed server 202.

Detailed Implementation

UNIX kernels can be shipped with a kernel resident kernel debugger component (as done in HP-UX), which implements the infrastructure for debugging the kernel. It also implements a number of device drivers for all standard LAN cards, and an UDP and DLPI protocol stacks through which remote communication can be established. Since remote debugger 214 does not use the kernel's TCP/IP stack, it can communicate with server 202 either through the UDP/IP protocol or through another system, called a communication server, running in the same subnet. Server 202 connects to the communication server with DLPI (Data Link Provider Interface), and the communication server can communicate with the outside world through TCP/IP. Alternatively, the kernel debugger subsystem of server 202 can communicate with the outside world with the UDP/IP protocol, provided that a DHCP (Dynamic Host Configuration Protocol) server is running on the network. DHCP allows a network administrator to supervise and distribute IP addresses from a central point, and automatically sends a new address when a computer is plugged into a different place in the network.

The HP-UX operating system supports the use of a dedicated hardware debug port for kernel debugging. The following is an overview of each communication mechanism.

1. LAN Based Remote Communication with Comm Server

Remote communication between server 202 and remote debugger 214 is achieved with LAN card 206 dedicated by its being claimed by the remote debugger 214 early (typically during the booting up of server 202). LAN card 206 is hidden from the kernel of server 202 so that only debugger traffic can be exchanged through this card. The full TCP/IP stack is not implemented, so remote debugger 214 communicates with another server in the same subnet as the target through DLPI. The communication server runs a very light protocol converter user level software, which communicates with remote host 208 through TCP/IP. This is a very reliable method of communication, which is available on essentially all HP computers.

2. LAN Based Remote Communication with UDP/IP Protocol

This method is similar to the first as it also uses LAN card 206. However, the kernel debugger subsystem of the kernel of server 202 implements a UDP/IP stack, so it is unnecessary to have an intermediate communication server. The UDP/IP protocol is suitable for use within the local area and requires an IP address for operation. IT helpdesks often provide dispensable IP addresses, so this may be a convenient form of remote communication.

3. Remote Communication through Hardware Sub/Sync

This approach is available only on some computers (such as HP cell servers), as it uses a hardware debug port that is not always provided. Firmware support is needed for accessing the debug port. Remote debugger 214 running on remote host 208 communicates by TCP/IP with a Management Processor board which houses the debug port. The Management Processor runs a daemon called "sub" that decodes the TCP/IP packet, and forwards it to the appropriate protection domain (partition) through an internal universal serial bus interface. This is a reliable communication approach, but restricted to only certain computers.

4. Serial Communication

Serial communication is widely used, but can be very slow. Though generally supported, it is not recommended owing to various advantages of the LAN and sub/sync based communications.

As is evident from the above discussion, LAN based remote communication is available on all HP computers. The choice of a comm server based or UDP/IP based method depends on the resource availability at the user site. For HP cell servers, users can use the sub/sync based hardware debug port.

For remote debugging server 202, server 202 needs to be pre-configured for hangtime kernel debugger initialization. This can be done by setting flags that tell the kernel that the remote debugger 214 should be initialized upon a hang. For remote communication, remote debugger 214 must claim a PCI LAN card. Since all LAN cards are typically claimed by the kernel during HP-UX bootup, remote debugger 214 cannot directly claim (i.e. start using) any ethernet LAN card.

In more recent versions of HP-UX, PCI Online Deconfigure (OLD) operation is supported by the HP-UX kernel, which allows HP-UX to relinquish any PCI card without bringing down the system. This is a simple operation from the user point of view, and—as mentioned above—can be triggered by pressing a hardware button or through a set of key strokes at the system console to generate an interrupt to the kernel. Upon receiving the interrupt, the kernel's I/O infrastructure relinquishes all the kernel resources associated with the LAN card and unlinks it with the associated kernel driver. After this is done, if the special flag that indicates whether remote debugger 214 should be brought up upon a hang is set, remote debugger 214 can initiate a scan of hardware of server 202 to detect and claim the LAN card, and initialize the debugger subsystem of the kernel so that remote debugger 214 can attach to the hung or slow kernel (of server 202). It should be noted that all this happens in the interrupt context, and thus does not affect the state of server 202 as such. The process is accomplished as follows.

1. Deconfiguration of any System Resources—Pre-Configuration Steps

Each PCI card has an associated hardware button called the PCI "doorbell", which can be pressed by the system administrator when a card has been identified for remote communication. Typically each card is claimed by HP-UX during boot so, upon pressing the PCI doorbell, the kernel internally starts deconfiguring the card. A five second delay is allowed before actual deconfiguration occurs. Within this delay, if the doorbell is pressed again, the deconfigure operation is cancelled. If not, an interrupt is generated to a processor's PDH interrupt vector, which calls kernels' OLAR (Online Addition and Replacement) subsystem to deconfigure the PCI card. All of this happens in the interrupt context, so no new kernel process or associated resources are required. (Optionally, PCI OLD can be achieved with the HP-UX olrad command interface also, which allows a similar deconfiguring a PCI LAN card.)

It may be noted that this step is not necessary if using the sub/sync based method on HP cell servers (as this method does not require usage of any LAN card or any other system or kernel resources). The kernel debugger's sub/sync driver is interrupt driven; the interrupt is raised by the firmware when it receives any packet from remote host 208. Hence, if the sub/sync method is used, the first packet sent by remote host 208 initializes the data structures of the kernel debugger infrastructure on the hung server 202, and no user process intervention is be required.

2. Kernel Debugger Online Initialization

In case the system being debugged is not hung, but the user wants temporarily to freeze server 202, inspect what is happening and monitor the performance of server 202, remote debugger 214 can be initialized—by running a simple user level utility called kwdbctl—when triggered by user level utilities. Initialization of remote debugger 214 is a two step process:

(i) The user specifies which kind of communication is desired; kwdbctl includes suitable options for doing so. If the user specifies the type of communication he or she wants, kwdbctl can trigger a PCI OLD by directly calling the I/O infrastructure of the kernel to have the kernel driver relinquish the card, and then claiming the card through the kernel debugger driver itself. In more recent releases of HP-UX, kernel debugger hardware scanning algorithm implements a robust mechanism to detect and claim only cards that are in a usable state and returns appropriate errors if a card specified by the user for remote communication has hardware problems. When applied to the sub/sync based remote communication, this step requires remote debugger 214 to program all hardware registers in the management processor and initialize the sub daemon so that it can receive and send packets from remote host 208. There are architected firmware interfaces to do so from the remote debugger initialization routines.

(ii) The second step is performed automatically once the first has been completed, and involves initializing the kernel debugger core subsystem. The remote debugger 214 does not use any system resources (such as additional memory requests from VM, etc), so this is also a very low cost operation. In this step, remote debugger 214 registers appropriate interrupt handlers for synchronizing processors upon a debugger event and registers the interrupt handlers that will be called when a debugger event (such as hitting breakpoints, watch points, etc) occurs.

3. Remote Attachment of Kernel Debugger

Once kernel debugger 214 is initialized, it is possible to remotely connect to server 202. If using the sub/sync communication, there is no restriction on the location of the remote host. For systems behind a subnet boundary, it is desirable to use the LAN based method with a communication server. The communication server, being lightweight software, can be executed on the gateway server itself. The user can then log onto server 202 through the communication server. The current implementation of communication server is for HP-UX servers only, but this can be easily ported for Linux or Windows brand systems without significant development cost.

4. Remote Debugger Session—Hung System Analysis and Performance Monitoring Examples Once remote debugger 214 attaches to server 202, it becomes possible to perform a number of performance analysis operations with remote debugger 214. The remote debugger client that interfaces with the existing kernel debugger of HP-UX is known as HP KWDB (Kernel Wildebeast Debugger), a user level utility that runs on remote host 208 and can run perl scripts compliant with the conventional q4 live debugger. HP KWDB also can be used directly and is easy to master, being based on GNU GDB.

Running within KWDB enables perl scripting automatically. A number of perl scripts are available for analyzing live memory and KWDB's remote communication method requests data from the remote target computer (in this embodiment, server 202). Since this is a script running on remote host 208 as a user level utility, the output can be easily redirected to a file on the file system for more elaborate analysis. Standard scripts that are otherwise available for live systems or crash dumps can be used to detect any memory leakage or any malicious processes, and hence further tuning and recovery is possible without bringing down the system at all. Since remote debugger 214 has access to the entire kernel space of the target kernel (of server 202), the user (such as support engineering and personnel knowledgeable in the HP-UX kernel space) can identify which processes are causing the slow operation of the system or which resources are in high demand. Remote debugger 214 has facilities by which rouge processes can be terminated and memory be freed back to operating system 204

5. Kernel Debugger Online Destruction

Once the remote performance analysis is complete, remote debugger 214 detaches and lets the kernel of server 202 continue its operation. It is advisable to destroy the particular instance of remote debugger 214 employed for the analysis at this point. Online destruction has two benefits for server 202: (i) the resources of server 202 that were being used for remote communication can be returned to server 202 for its own use; and (ii) the future performance of server 202 can no longer be influenced by remote debugger 214.

Remote debugger 214 can be destroyed by running the kwdbctl utility with a special option. Now that server 202 is live again and working normally, running kwdbctl with that option is not a problem. This option prompts the relinquishing of the DMA being used by the communication network card (if LAN/UDP based methods have been used), and then the resetting of all data structures of remote debugger 214 itself. This is also not a costly operation and can be performed by a system administrator with superuser privileges.

6. Post Deconfiguration Steps (if any)

After deconfiguration, the operating system 204 of server 202 may reclaim the LAN card 206 that was used for kernel debugging. As will be appreciated by those in the art, this is not necessary for sub/sync based communication. Online addition is supported by HP-UX for all PCI devices. This can be done by pressing the PCI doorbell or through the olrad command line interface methods as applicable.

The foregoing description of the exemplary embodiments is provided to enable any person skilled in the art to make or use the present invention. While the invention has been described with respect to particular illustrated embodiments, various modifications to these embodiments will readily be apparent to those skilled in the art, and the generic principles defined herein may be applied to other embodiments without departing from the spirit or scope of the invention. It is therefore desired that the present embodiments be considered in all respects as illustrative and not restrictive. Accordingly, the present invention is not intended to be limited to the embodiments described above but is to be accorded the widest scope consistent with the principles and novel features disclosed herein.

The invention claimed is:

1. A method for debugging a hung or crashed computing system or panicked software, comprising:
   executing a debugger on a remote computer;
   connecting said computing system to said remote computer with a communications link comprising deconfiguring a kernel driver in said computing system that previously controlled a communications link interface card and substituting a kernel debugger driver for controlling said communications link interface card to connect said computing system to said remote computer; and
   debugging said operating system or said panicked software of said computing system with said debugger.

2. A method as claimed in claim 1, including destroying the instance of said debugger used for said debugging after completing said debugging with said debugger.

3. A method as claimed in claim 1, including said operating system of said computer reclaiming a communications card of said computing system used for connecting to said remote computer.

4. The method of claim 1, wherein said debugger terminates one or more processes running on said computing system.

5. The method of claim 1, wherein said communications link comprises a Data Link Provider Interface (DLPI) and a communication server between the computing system and remote computer with the debugger.

6. A method for debugging a computing device, comprising:
   deconfiguring a kernel driver in said computing system that previously controlled a communications link interface card and substituting a kernel debugger driver for controlling said communications link interface card;
   with said kernel debugger driver operating said communications link interface card, establishing a communications link with a remote computer that is executing a debugger.

7. The method of claim 6, further comprising debugging an operating system or panicked software of said computing system with said debugger.

8. The method of claim 6, further comprising receiving a designated key sequence input by an administrator to an interrupt handler which initializes a debugger subsystem of the computing system that performs said deconfiguring of said kernel driver.

9. The method of claim 6, further comprising stopping everything except a single foreground processor of the computing system when the debugger has connected to the computing system.

10. The method of claim 6, wherein said communications link comprises a Data Link Provider Interface (DLPI) and a communication server between the computing system and remote computer with the debugger.

11. The method of claim 6, wherein said communications link with said remote computer comprises a UDP/IP stack.

12. A computing system, comprising:
   an operating system;
   a remote computing device;
   a communications link for connecting said computing system and said remote computing device; and
   a debugger accessible by said remote computing device and executable on said remote computing device;
   wherein said remote computing device is operable to connect to said computing system with said communications link and to execute said debugger, said debugger being operable by a user to debug said operating system or panicked software following said operating system hanging or crashing or said software panicking; and
   wherein said computing system is configured to deconfigure a kernel driver of said operating system in response to a hanging or crashing of said operating system and substitute a kernel debugger driver for controlling said communications link interface card prior to connecting to said remote computer.

13. A system as claimed in claim 12, wherein said remote computer is configured to destroy the instance of said debugger used to debug said operating system or said panicked software after said operating system or said panicked software has been debugged.

14. A system as claimed in claim 12, wherein said operating system is configured to reclaim a communications card of said computing system used for connecting to said remote computer.

15. A computing system configured to be debugged remotely and having an operating system, comprising:
   a computer configured in response to said operating system hanging or crashing or in response to a panic of other software of said computing system to deconfigure a kernel driver of said computer, to connect to a remote computer provided with a remote debugger, and to accept debugging commands from said remote debugger for said operating system or said other software.

16. A system as claimed in claim 15, wherein said computer is configured to reclaim a communications card of said computer used for connecting to said remote computer.

17. The computing system of claim 15, wherein said connection with said remote computer comprises a Data Link Provider Interface (DLPI) and a communication server between the computing system and remote computer with the remote debugger.

18. The computing system of claim 15, said computer further configured to substitute a debugger kernel driver for said deconfigured kernel driver during communication with said remote computer.

19. The computing system of claim 15, wherein said connection with said remote computer comprises a UDP/IP stack.

* * * * *